United States Patent
Hazen et al.

(10) Patent No.: US 8,855,804 B2
(45) Date of Patent: Oct. 7, 2014

(54) CONTROLLING A DISCRETE-TYPE MANUFACTURING PROCESS WITH A MULTIVARIATE MODEL

(75) Inventors: Daniel Robert Hazen, Round Rock, TX (US); Christopher Paul Ambrozic, Madison, NJ (US); Christopher Peter McCready, London (CA)

(73) Assignee: MKS Instruments, Inc., Andover, MA (US)

( * ) Notice: Subject to any disclaimer, the term of this patent is extended or adjusted under 35 U.S.C. 154(b) by 357 days.

(21) Appl. No.: 12/947,651

(22) Filed: Nov. 16, 2010

(65) Prior Publication Data

US 2012/0123583 A1    May 17, 2012

(51) Int. Cl.
G05B 23/00    (2006.01)
G05B 15/02    (2006.01)
G05B 23/02    (2006.01)

(52) U.S. Cl.
CPC ............ G05B 23/0221 (2013.01); G05B 15/02 (2013.01)
USPC ............ 700/200; 700/110; 700/109; 700/108

(58) Field of Classification Search
None
See application file for complete search history.

(56) References Cited

U.S. PATENT DOCUMENTS

| | | | |
|---|---|---|---|
| 5,135,688 A | 8/1992 | Nakamura et al. | 264/40.6 |
| 5,149,472 A | 9/1992 | Suganuma | 264/40.6 |
| 5,173,224 A | 12/1992 | Nakamura et al. | 264/40.6 |
| 5,403,433 A | 4/1995 | Morrison et al. | 156/626 |
| 5,408,405 A | 4/1995 | Mozumder et al. | 364/151 |
| 5,442,562 A * | 8/1995 | Hopkins et al. | 700/108 |
| 5,469,361 A | 11/1995 | Moyne | 364/468 |
| 5,479,340 A | 12/1995 | Fox et al. | 364/153 |
| 5,544,256 A | 8/1996 | Brecher et al. | 382/149 |
| 5,587,792 A | 12/1996 | Nishizawa et al. | |
| 5,710,700 A | 1/1998 | Kurtzberg et al. | 364/149 |
| 5,786,999 A | 7/1998 | Spahr et al. | 364/475.05 |
| 5,815,397 A | 9/1998 | Saito et al. | 365/475.09 |
| 5,885,624 A | 3/1999 | Katsuta et al. | 425/149 |

(Continued)

FOREIGN PATENT DOCUMENTS

DE    101 14 211 A1    11/2001
DE    100 40 731 A1    3/2002

(Continued)

OTHER PUBLICATIONS

Chen et al., "Plasma etch modeling using optical emission spectroscopy," J. Vac. Sci. Technol. A 14(3), May/Jun. 1996, pp. 1901-1906.

(Continued)

Primary Examiner — Kavita Padmanabhan
Assistant Examiner — Christopher E Everett
(74) Attorney, Agent, or Firm — Proskauer Rose LLP

(57) ABSTRACT

Described are methods, systems, and a computer-readable storage medium for controlling a discrete-type manufacturing process (e.g., an injection molding process) with a multivariate model. Data representing process parameters, operating parameters, or both of the manufacturing process are received. The received data is compared with a multivariate model that approximates the manufacturing process to provide a result. Upon the result of the comparing satisfying a condition, one or more values for a set of operating parameters for the manufacturing process are determined. When the one or more determined values for the set of operating parameters satisfies a criterion, at least one operating parameter of the manufacturing process is updated.

31 Claims, 6 Drawing Sheets

(56) References Cited

U.S. PATENT DOCUMENTS

| | | | | |
|---|---|---|---|---|
| 5,900,633 | A | 5/1999 | Solomon et al. | |
| 5,949,678 | A | 9/1999 | Wold et al. | 364/188 |
| 5,993,704 | A | 11/1999 | Bader | 264/40.1 |
| 5,997,778 | A | 12/1999 | Bulgrin | 264/40.1 |
| 6,090,318 | A | 7/2000 | Bader et al. | 264/40.1 |
| 6,153,115 | A | 11/2000 | Le et al. | 216/60 |
| 6,336,082 | B1 | 1/2002 | Nguyen et al. | 702/179 |
| 6,354,145 | B1 | 3/2002 | Fransson et al. | 73/61.52 |
| 6,368,883 | B1 | 4/2002 | Bode et al. | 438/14 |
| 6,442,445 | B1 | 8/2002 | Bunkofske et al. | 700/108 |
| 6,453,246 | B1 | 9/2002 | Agrafiotis et al. | 702/27 |
| 6,456,899 | B1 | 9/2002 | Gleason et al. | 700/212 |
| 6,528,331 | B1 | 3/2003 | Bode et al. | 438/14 |
| 6,556,884 | B1 | 4/2003 | Miller et al. | 700/121 |
| 6,564,119 | B1 | 5/2003 | Vaculik et al. | 700/146 |
| 6,584,368 | B2 | 6/2003 | Bunkofske et al. | 700/83 |
| 6,594,620 | B1 | 7/2003 | Qin et al. | 702/185 |
| 6,607,577 | B2 | 8/2003 | Vaculik et al. | 75/375 |
| 6,678,569 | B2 | 1/2004 | Bunkofske et al. | 700/108 |
| 6,682,669 | B2* | 1/2004 | Bulgrin et al. | 264/40.1 |
| 6,687,558 | B2* | 2/2004 | Tuszynski | 700/97 |
| 6,718,224 | B2 | 4/2004 | Firth et al. | 700/121 |
| 6,721,616 | B1 | 4/2004 | Ryskoski | 700/108 |
| 6,741,903 | B1 | 5/2004 | Bode et al. | 700/121 |
| 6,801,831 | B2 | 10/2004 | Sasaki | 700/200 |
| 6,830,939 | B2 | 12/2004 | Harvey et al. | 438/8 |
| 6,839,655 | B2 | 1/2005 | Gross et al. | 702/179 |
| 6,876,931 | B2 | 4/2005 | Lorenz et al. | 702/22 |
| 6,917,839 | B2 | 7/2005 | Bickford | 700/30 |
| 6,967,899 | B1 | 11/2005 | O'Brien, Jr. et al. | 367/131 |
| 6,968,253 | B2 | 11/2005 | Mack et al. | 700/121 |
| 6,975,944 | B1 | 12/2005 | Zenhausern | 702/22 |
| 6,983,176 | B2 | 1/2006 | Gardner et al. | 600/310 |
| 7,003,490 | B1 | 2/2006 | Keyes | 705/38 |
| 7,031,800 | B2 | 4/2006 | Bulgrin | 700/200 |
| 7,043,401 | B2 | 5/2006 | Taguchi et al. | 702/183 |
| 7,062,417 | B2 | 6/2006 | Kruger et al. | 703/2 |
| 7,072,794 | B2 | 7/2006 | Wittkowski | 702/179 |
| 7,107,491 | B2 | 9/2006 | Graichen et al. | 714/37 |
| 7,151,976 | B2 | 12/2006 | Lin | 700/108 |
| 7,189,964 | B2 | 3/2007 | Castro-Perez et al. | 250/282 |
| 7,191,106 | B2 | 3/2007 | Minor et al. | 703/2 |
| 7,198,964 | B1 | 4/2007 | Cherry et al. | |
| 7,216,005 | B2 | 5/2007 | Shioiri et al. | 700/48 |
| 7,313,454 | B2 | 12/2007 | Hendler et al. | 700/110 |
| 7,465,417 | B2 | 12/2008 | Hutson et al. | 264/40.1 |
| 7,597,827 | B2 | 10/2009 | Frey | 264/40.6 |
| 7,622,308 | B2 | 11/2009 | Hendler et al. | 438/10 |
| 7,840,297 | B1* | 11/2010 | Tuszynski | 700/108 |
| 2002/0038926 | A1 | 4/2002 | Vaculik et al. | 266/90 |
| 2002/0143472 | A1 | 10/2002 | Mutter | 702/20 |
| 2003/0011376 | A1 | 1/2003 | Matsushita et al. | 324/500 |
| 2003/0033040 | A1* | 2/2003 | Billings | 700/97 |
| 2003/0065462 | A1 | 4/2003 | Potyrailo | 702/81 |
| 2003/0182281 | A1 | 9/2003 | Wittkowski | 707/5 |
| 2004/0049295 | A1* | 3/2004 | Wojsznis et al. | 700/28 |
| 2004/0055888 | A1 | 3/2004 | Wikiel et al. | 205/81 |
| 2004/0064259 | A1 | 4/2004 | Haaland et al. | |
| 2004/0064357 | A1 | 4/2004 | Hunter et al. | 705/10 |
| 2004/0083065 | A1 | 4/2004 | Daniel et al. | |
| 2004/0116814 | A1 | 6/2004 | Stranc et al. | 600/473 |
| 2004/0122859 | A1 | 6/2004 | Gavra et al. | 707/104.1 |
| 2004/0153815 | A1 | 8/2004 | Volponi | 714/37 |
| 2004/0186603 | A1 | 9/2004 | Sanford et al. | 700/95 |
| 2004/0204775 | A1* | 10/2004 | Keyes et al. | 700/29 |
| 2004/0215424 | A1 | 10/2004 | Taguchi et al. | 702/189 |
| 2004/0225377 | A1 | 11/2004 | Kokotov et al. | 700/1 |
| 2004/0228186 | A1 | 11/2004 | Kadota | 365/202 |
| 2004/0254762 | A1 | 12/2004 | Hopkins et al. | |
| 2004/0259276 | A1 | 12/2004 | Yue et al. | |
| 2005/0028932 | A1 | 2/2005 | Shekel et al. | 156/345.15 |
| 2005/0037515 | A1 | 2/2005 | Nicholson et al. | 436/173 |
| 2005/0043902 | A1 | 2/2005 | Haaland et al. | 702/30 |
| 2005/0045821 | A1 | 3/2005 | Noji et al. | 250/311 |
| 2005/0060103 | A1 | 3/2005 | Chamness | 702/30 |
| 2005/0130321 | A1 | 6/2005 | Nicholson et al. | 436/518 |
| 2005/0251276 | A1 | 11/2005 | Shen | 700/108 |
| 2005/0268197 | A1 | 12/2005 | Wold | 714/746 |
| 2006/0012064 | A1 | 1/2006 | Hutson et al. | |
| 2006/0039598 | A1* | 2/2006 | Kim et al. | 382/145 |
| 2006/0058898 | A1* | 3/2006 | Emigholz et al. | 700/29 |
| 2006/0111804 | A1 | 5/2006 | Lin | 700/110 |
| 2006/0122807 | A1 | 6/2006 | Wittkowski | 702/179 |
| 2006/0184264 | A1 | 8/2006 | Willis et al. | 700/108 |
| 2007/0021859 | A1 | 1/2007 | Lev-Ami et al. | 700/121 |
| 2007/0100475 | A1* | 5/2007 | Korchinski | 700/28 |
| 2008/0010531 | A1 | 1/2008 | Hendler et al. | 714/33 |
| 2008/0015814 | A1* | 1/2008 | Harvey et al. | 702/179 |
| 2008/0082194 | A1* | 4/2008 | Samardzija et al. | 700/109 |
| 2008/0082195 | A1* | 4/2008 | Samardzija | 700/109 |
| 2008/0125898 | A1* | 5/2008 | Harvey et al. | 700/110 |
| 2008/0183311 | A1* | 7/2008 | MacArthur et al. | 700/29 |
| 2008/0221720 | A1* | 9/2008 | Hendler et al. | 700/109 |
| 2008/0262795 | A1* | 10/2008 | Webb et al. | 702/184 |
| 2009/0037013 | A1* | 2/2009 | Hendler et al. | 700/103 |
| 2009/0055140 | A1 | 2/2009 | Kettaneh et al. | 703/2 |
| 2009/0164171 | A1 | 6/2009 | Wold et al. | 702/179 |
| 2009/0210081 | A1* | 8/2009 | Sustaeta et al. | 700/99 |
| 2009/0287320 | A1 | 11/2009 | MacGregor et al. | 700/29 |
| 2009/0312851 | A1* | 12/2009 | Mishra | 700/30 |
| 2010/0057237 | A1 | 3/2010 | Kettaneh et al. | 700/103 |
| 2010/0191361 | A1 | 7/2010 | McCready et al. | 700/104 |
| 2011/0276169 | A1* | 11/2011 | Bourg et al. | 700/109 |
| 2012/0239167 | A1* | 9/2012 | Carrette | 700/52 |

FOREIGN PATENT DOCUMENTS

| | | | |
|---|---|---|---|
| EP | 0 524 317 A1 | 1/1993 | |
| EP | 0737560 | 10/1996 | B29C 45/76 |
| GB | 2 394 312 A | 4/2004 | |
| GB | 2 441 640 A | 3/2008 | |
| JP | 02-120019 | 5/1990 | |
| JP | 08-118443 | 5/1996 | B29C 45/76 |
| WO | 03/085504 | 10/2003 | |
| WO | 03/103024 | 12/2003 | |
| WO | 2004/019147 | 3/2004 | |
| WO | 2004/046835 | 6/2004 | |
| WO | 2005/114338 | 12/2005 | |
| WO | 2006/019448 | 2/2006 | B29C 45/76 |
| WO | 2007/046945 A2 | 4/2007 | |
| WO | 2010/085479 | 7/2010 | G05B 13/04 |
| WO | 2012/067727 | 5/2012 | G05B 23/02 |

OTHER PUBLICATIONS

Eriksson et al., *Multi- and Megavariate Data Analysis: Part I Basic Principles and Applications* (2nd. ed.), Umetrics Academy (2006).

Eriksson et al., *Multi- and Megavariate Data Analysis: Part II Advanced Applications and Method Extensions* (2nd. ed.), Umetrics Academy (2006).

Gallagher et al., "Development and Benchmarking of Multivariate Statistical Process Control Tools for a Semiconductor Etch Process: Improving Robustness through Model Updating," IFAC ADCHEM'97, 78-83, Banff, Canada, Jun. 1997.

Goodlin et al., "Simultaneous Fault Detection and Classification for Semiconductor Manufacturing Tools," 201$^{st}$ Meeting of the Electrochemical Society, International Symposium on Plasma Processing XIV, Abs. 413, Philadelphia, PA, May 2002, 16 pages.

Goodlin et al., "Simultaneous Fault Detection and Classification for Semiconductor Manufacturing Tools," Journal of the Electrochemical Society, 150 (12), May 12, 2002, pp. G778-G784.

"Hotelling's T squared," Engineering Statistics Handbook [online], Ch. 6.5.4.3, 2 pages [retrieved on Jan. 13, 2006]. Retrieved from the Internet: <URL: http://www.itl.nist.gov/div898/handbook/pmc/section5/pmc543.htm>.

Kresta et al., "Multivariate Statistical Monitoring of Process Operating Performance," The Canadian Journal of Chemical Engineering, vol. 69, Feb. 1991, pp. 35-47.

Jiang et al., "Fault Diagnosis for Batch Processes Based on Improved MFDA," 2005 IEEE International Conference on Systems Man, and Cybernetics, vol. 4, pp. 3420-3425, Oct. 10-12, 2005, IEEE, Piscataway, NJ, (ISBN 0-7803-9298-1).

(56) References Cited

OTHER PUBLICATIONS

Lymberopoulos et al., "Advanced Process Control Comes of Age," Semiconductor International [online], 5 pages, Jul. 1, 2004 [retrieved on Nov. 19, 2008]. Retrieved from the Internet: <URL: http://www.semiconductor.net/index.asp?layout=articlePrint&articleID=CA430898>.

Martin et al., "Multivariate Statistical Process Control and Process Performance Monitoring," IFAC Dynamics and Control of Process Systems, 1999, XP-000911903, pp. 347-356.

Mason et al., "Applying Hotelling's $T^2$ Statistic to Batch Processes," J. Quality Technology, vol. 33, No. 4, Oct. 2001, pp. 466-479.

"Pearson's Correlation Coefficient," Teach/Me Data Analysis [online], 2 pages [retrieved on Dec. 9, 2005]. Retrieved from the Internet: <URL: http://www.vias.org/tmdataaleng/cc_corr_coeff.html>.

"Process leaps without new hardware," EuroAsia Semiconductor [online], Nov. 2004, 3 pages [retrieved on Nov. 19, 2008]. Retrieved from the Internet: <URL http://www.euroasiasemiconductor.com/print_version.php?id=5677>.

Skumanich et al., "Advanced etch applications using tool-level data," Solid State Technology [online], 7 pages [retrieved on Jan. 27, 2005]. Retrieved from the Internet: <URL: http://sst.pennnet.com/articles/article_display.cfm?section=archi&article_id=206470&vers...>.

Smith et al., "From Sensor Data to Process Control: A Networked Framework," Semiconductor Manufacturing Magazine, Jul. 2004, 6 pages.

Smith et al., "Practical, Real-Time Multivariate FDC," Semiconductor International [online], Dec. 1, 2004, 6 pages [retrieved on Dec. 16, 2005]. Retrieved from the Internet: <URL: http://www.reed-electronics.com/semiconductor/index.asp?layout=articlePrint&articleID=CA483628>.

Solomon et al., "Real-Time Measurement of Film Thickness, Composition, and Temperature by FT-IR Emission and Reflection Spectroscopy," in *Semiconductor Characterization: Present Status and Future Needs*, (Bullis et al.) AIP Press, 1996, pp. 544-548.

"TOOLweb Blue Box Professional: Enabling High Speed, Multi-User Connectivity and Data Sharing," Control & Information Technology [online], Mar. 2005, 4 pages [retrieved on Nov. 19, 2008]. Retrieved from the Internet: <URL: http://www.mksinst.com/docs/ur/ipcblueds.pdf>.

"TOOLweb Applications Support: AEC/APC Applications Engineering, Integration and Deployment Support," Control & Information Technology [online], Sep. 2005, 4 pages [retrieved on NOv. 19, 2008]. Retrieved from the Internet: <URL: http://www.mksinst.com/docs/UR/TWT3DS.pdf>.

"TOOLweb: APC & e-Diagnostics Suite," Control & Information Technology [online], 4 pages [retrieved on NOv. 19, 2008]. Retrieved from the Internet: <URL: http://www.mksinst.com/docs/ur/twmvads.pdf>.

"TOOLweb SenseLink: Web-Enables Existing Sensors," Control & Information Technology [online], 4 pages [retrieved on Nov. 19, 2008]. Retrieved from the Internet: <URL: http://www.mksinst.com/docs/ur/twsenselinkds.pdf>.

"User's Guide to SIMCA-P, Simca-P+," Umetrics AB, Version 11.0, May 17, 2005, pp. 1-456.

Wang et al., "Process Monitoring in Principal Component Subspace: Part 1. Fault Reconstruction Study," 2004 IEEE International Conference on Systems, Man and Cybernetics, The Hague, The Netherlands, vol. 6, Oct. 10-13, 2004, pp. 5119-5124.

Wold et al., "Hierarchical Multiblock PLS and PC Models for Easier Model Interpretation and as an Alternative to Variable Selection," Journal of Chemometrics, vol. 10, 1996, pp. 463-482.

Wold et al., "Modelling and diagnostics of batch processes and analogous kinetic experiments," Chemometrics and Intelligent Laboratory Systems, vol. 44, Nos. 1-2, 1998, pp. 331-340.

Wold et al., "2.10 Batch Process Modeling and MSPC," in *Comprehensive Chemometrics: Chemical and Biochemical Data Analysis*, (Brown et al. Eds.), Oxford, UK: Elsevier, 37 pages (2009).

Xu et al., "A Novel Combination Method for On-Line Process Monitoring and Fault Diagnosis," IEEE ISIE 2005, Dubrovnik, Croatia, Jun. 20-23, 2005, pp. 1715-1719.

Fugee Tsung, Jianjun Shi, C.F. J. Wu: "Joint Monitoring of PID-Controlled Processes" Journal of Quality Technology, vol. 31, No. 3, Jul. 1, 1999, pp. 275-285, XP002579609.

Ahmed S. F., A New Approach in Industrial Automation Application "Embedded System Design for Injection Molding Machine," IEEE Xplore, Oct. 29, 2009, 5 pages.

Bai, et al., "IMPOS: A Method and System for Injection Molding Optimization," IEEE Xplore, Oct. 29, 2009, 5 pages.

Chen, et al., "Application of Advanced Process Control in Plastic Injection Molding," IEEE Xplore, Oct. 29, 2009. 6 pages.

Chen, et al., "Injection Molding Quality Control by Integrating Weight Feedback into a Cascade Closed-Loop Control System," Polymer Engineering and Science, 2007, 11 pages.

Dubay, et al., "An Investigation on the Application of Predictive Control for Controlling Screw Position and Velocity on an Injection Molding Machine," Polymer Engineering and Science, 2007, 10 pages.

Fung, et al., "Application of a Capacitive Transducer for Online Part Weight Prediction and Fault Detection in Injection Molding," Polymer Engineering and Science, 2007, 7 pages.

Li, et al., "A Real-Time Process Optimization System for Injection Molding," Polymer Engineering and Science, 2009, 10 pages.

Li, et al., "Predicting the Parts Weight in Plastic Injection Molding Using Least Squares Support Vector Regression," IEEE Transactions on Systems, Man, and Cybernetics—Part C: Applications and Reviews, vol. 38, No. 6, Nov. 2008, 7 pages.

Liu, et al, "Identification and Autotuning of Temperature-Control System With Application to Injection Molding," IEEE Transactions on Control Systems Technology, vol. 17, No. 6, Nov. 2009, 13 pages.

Mei, et al., "The Optimization of Plastic Injection Molding Process Based on Support Vector Machine and Genetic Algorithm," International Conference on Intelligent Computation Technology and Automation, 2008, 4 pages.

Shu, et al., "PID Neural Network Temperature Control System in Plastic Injecting-moulding Machine," Third International Conference on Natural Computation, 2007, 5 pages.

Tan et al., "Adaptive Control of Ram Velocity for the Injection Moulding Machine," IEEE Transactions on Control Systems Technology, vol. 9, No. 4, Jul. 2001, 9 pages.

Yang J. H., "Nonlinear Adaptive Control for Injection Molding Machines," IEEE Xplore, Oct. 29, 2009, 6 pages.

You et al., "Research on Temperature Measure and Control Method in Mold-Temperature-Control Solidification," IEEE International Conference on Control and Automation WeCP-18, Guangzhou, China—May 30 to Jun. 1, 2007, 4 pages.

Triefenbach, F., "Design of Experiments: The D-Optimal Approach and Its Implementation as a Computer Algorithm," Bachelor's Thesis in Information and Communication Technology, Jan. 15, 2008, 84 pages.

"State space (controls)," State space (controls)—Wikipedia, the free encyclopedia [online], 11 pages [retrieved on Sep. 14, 2010]. Retrieved from the Internet: <URL: http://en.wikipedia.org/wiki/State_Space_(controls)>.

International Search Report for International Application No. PCT/US2010/021486, Date of Mailing Jul. 5, 2010 (20 pages total).

Knights, M., "Injection Mold Balance Unbalanced," Plastics Technology, http://www.ptonline.com/articles/200811fal.html; Nov. 2008, 5 pages.

J. W. Mann, "Process Parameter Control: the Key to Optimization," *Plastics Engineering*, vol. 30, pp. 25-27, 1974.

N. M. Morris and W. B. Rouse, "The Effects of Type of Knowledge Upon Human Problem Solving in a Process Control Task," *IEEE Transactions on Systems, Man and Cybernetics*, vol. SMC-15, No. 6 pp. 698-707, 1985.

Yonehara and I. Ito, "Finding an optimal operation conditions of plastic molding by artificial neural network," *Nippon Kikai Gakkai Ronbunshu, C Hen/Transactions of the Japan Society of Mechanical Engineers, Part C*, vol. 63, pp. 3538-3543, 1997.

(56) References Cited

OTHER PUBLICATIONS

C. M. Seaman, et al., "Multiobjective optimization of a plastic injection molding process," *IEEE Transactions on Control Systems Technology*, vol. 2, No. 3, pp. 157-168, 1994.

C. E. Castro, et al., "Multiple criteria optimization with variability considerations in injection molding," *Polymer Engineering and Science*, vol. 47, p. 400, 2007.

D. Kazmer and C. Roser, "Evaluation of Product and Process Design Robustness," *Research in Engineering Design*, vol. 11, pp. 20-30, 1999.

P. Knepper and D. Kazmer, "Multi-objective velocity profile optimization," Charlotte, NC, United States, 2006, pp. 1093-1097.

G. Sherbelis, et al., "The Methods and benefits of Establishing a Process Window," *in Proceedings of the 55th Annual Technical Conference, ANTEC*, Part 1 (of 3), 1997, pp. 545-550.

D. Kazmer, "Chapter 13: Quality Control," in *Plastics Manufacturing Systems Engineering*, ed Munich: Carl Hanser Verlag, 2009, pp. 387-418.

R. Ivester, et al., "Automatic tuning of injection molding by the virtual search method," *Journal of Injection Molding*, vol. 2/No. 3, Sep. 1998.

D. Kazmer and S. Westerdale, "A model-based methodology for on-line quality control," *Int J Adv Manuf Technol*, vol. 42, pp. 280-292, 2009.

R. H. Myers and D. C. Montgomery, "Response Surface Methodology: Process and Product Optimization Using Designed Experiments," in *Wiley Series in Probability and Statistics*, ed: Wiley Interscience, 1995, p. 248.

M. Berins, "Standards for Molding Tolerances," in *SPI Plastics Engineering Handbook of the Society of the Plastics Industy, Inc. (5th Edition)* 5th ed: Kluwer Academic Publishers, 1991, pp. 821-844.

D. O. Kazmer, et al., "A Comparison of Statistical Process Control (SPC) and On-Line Multivariate Analyses (MVA) for Injection Molding," *International Polymer Processing*, vol. 23, pp. 447-458, 2008.

F. Yacoub, et al., "Product and Control in the Latent Variable Space of Nonlinear PLS Models," *Chemometrics and Intelligent Laboratory Sytems*, 70, pp. 63-74, 2004.

International Search Report for PCT/US2011/054719 dated Dec. 14, 2011, 11 pages.

Translation of Japanese Office Action Issued in Corresponding Japanese Patent Application No. 2013-538724, Apr. 1, 2014.

\* cited by examiner

CONTROLLING A DISCRETE-TYPE MANUFACTURING PROCESS WITH A MULTIVARIATE MODEL

TECHNICAL FIELD

The methods, systems, and computer-program products described generally relate to data analysis and control of a discrete-type manufacturing process, and particularly to controlling a discrete-type manufacturing process, such as an injection molding process, with a multivariate model.

BACKGROUND

Injection molding is a manufacturing process in which a molten material (e.g., melted plastic) is injected under pressure into a mold cavity or cavities. The molten material is held under pressure in the cavity or cavities until has cooled, at which point the material is removed in a solid state, effectively duplicating the cavity of the mold. Various articles of commercial value, such as plastic bottles, toothbrushes, automotive parts, medical devices, children's toys, etc., are made using injection molding techniques. Injection molding is widely used because of its ability to produce complex parts with low-cost and high throughput. However, as the demand for productivity and throughput grows, it is difficult to achieve the desired quality level without significant monitoring and control.

An injection molding process is a discrete-type manufacturing process in that a material is supplied to a mold, which cools the material very quickly. Given the relatively short time frame involved, observation and control of the process typically involves measurements made before and after the process as a way to understand the process.

A typical process tool used in current injection molding can be described by a set of several hundred (or in some instances several thousand) process variables. The variables are generally related to physical parameters of the manufacturing process and/or tools used in the manufacturing process such as the mold. In some cases, of these several thousand variables, several hundred variables will be dynamic (e.g., changing in time during the manufacturing process or between manufacturing processes). The dynamic variables, for example, material temperature, mold temperature, material composition, delivery time, cooling time, relative humidity, delivered power, current, voltage, and temperature change based on, for example, a specific molten material, mold size, or mold geometry, errors and faults that occur during the manufacturing process or changes in parameter values based on use of a particular mold or cavity (e.g., referred to as "drift").

Process variables are frequently related to yield or response variables. The process variables can be thought of as predictors or indicators of the yield or response variables based on an underlying relationship between the variables. Data indicative of the process and yield variables are measured and stored during a manufacturing process, either for real-time or later analysis.

A discrete-type manufacturing process, e.g., an injection molding process, can be characterized by operating parameters (e.g., variables that an operator can set) and by process parameters (e.g., variables that are observed about the process). Operating parameters can be related to process parameters, though the quantitative relationship relating operating parameters and process parameters can be complicated and not well-understood.

An injection molding system usually includes a number of built-in temperature, pressure, speed, and stroke sensors to guide the interpretation, adjustment, and/or determination of operating and process parameters of the machine by experienced molding personnel. Not only are such sensors costly, but the relationship between machine operating parameters, process parameters, and the properties, qualities, and characteristics of the molded product are complex and often vary on a case-by-case basis.

While some control technology currently exists including open-loop controllers, limited closed-loop controllers, and certain models based on differential equations or object-oriented hierarchical modeling, such controllers typically control each operating parameter independently of other operating parameters, which essentially ignores the root cause of the process deviations. Such an approach does not easily adjust to slow-moving process changes and instead attempts to provide constant within-run process adjustments. This type of continuous tweaking of the process while it is occurring often leads to further and more serious problems and a seemingly never-ending pursuit of the optimal process.

SUMMARY

The concepts described herein involve a closed-loop process for controlling discrete manufacturing processes, e.g., injection molding, based on a multivariate model. The multivariate model can approximate the process, predict the process, or both. The multivariate model can be based on, e.g., a principal component analysis to capture the relationships between process settings. Using a multivariate model provides a method by which to handle more complex defects and to optimize a discrete manufacturing process based on slow-moving inputs (e.g., changes in material, machinery, and environment). The dynamics of the process states can be explicitly modeled as a function of the process settings. The optimization process includes evaluating the process behavior according to, e.g., a principal components analysis (PCA). PCA is used since a well instrumented process can provide hundreds of data points for each manufacturing cycle. PCA reduces the redundancy by introducing new variables called principle components that consist of orthogonal linear combinations of the original variables. The resulting model will typically have fewer principle components than the original number of process states while explaining more of the observed process variation than a conventional linear regression. The control model can be tailored to each application and will therefore provide improved accuracy over a generalized approach across all applications. In addition, the ability to optimize the process based on multiple process parameters will allow for a clearer understanding of the root cause of the process deviations, leading to reduced inefficiencies associated with in-process tweaking and pursuit of optimal process parameters.

The multivariate model is incorporated into a system or method to automatically manipulate or control the manufacturing process, e.g., operating parameters of the manufacturing process, to maintain desirable operating and process parameters, and to detect and identify faults in the manufacturing process. Conceptually, the approach described here adds a layer of multivariate control (e.g., automated control) above and beyond process monitoring. Thus, in addition to detecting and diagnosing potential issues in the process, the method, system, and controllers described here can implement corrective action (e.g., by modifying operating parameters of the process) substantially in real-time via a closed loop process, resulting in higher and more consistent quality, less culled or scrapped materials or final products, less downtime, and less opportunity for human error.

Several features described herein provide further advantages as will be apparent to those of skill in the art. For example, multivariate statistical data are embedded in a model-based control structure. The control structure can provide expected values of certain types of data and statistics associated with the manufacturing process and control of the manufacturing process. Multivariate methods for estimating future values of process parameters (sometimes called dependent variables) and/or operating parameters (sometimes called manipulated or manipulable variables) are used to account for past, present, and/or future values of those variables, trends in variables or multivariate statistics, and adapt or adjust the manufacturing process based on the results of predicted future changes. Multivariate (e.g., Hotelling's $T^2$ or DModX) statistics or values (e.g., scores or t-scores) are provided and/or predicted. Moreover, multivariate methods for estimating future values of process parameters are also described.

In one aspect, there is a method for controlling an injection molding process, and in another aspect, there is a computer-readable storage medium including instructions operable to cause data processing apparatus in communication with an injection molding apparatus to perform steps of the method. The method involves receiving data measured after at least a portion of the injection molding process. The data generally represents process parameters, operating parameters, or both of the injection molding process. The method involves comparing the received data with a multivariate model that approximates the injection molding process to provide a result. Upon the result of the comparison satisfying a condition, the method further involves determining one or more values for a set of operating parameters for the injection molding process and updating at least one operating parameter of the injection molding process when the one or more determined values for the set of operating parameters satisfies a criterion.

In some embodiments, the set of operating parameters includes ideal operating parameters (or idealized values for the operating parameters) of the injection molding process. Values of the process parameters can include values observed outside of a mold, within one or more cavities of the mold, or both. In some embodiments, the process parameters are not directly configurable during the injection molding process (e.g., process parameters are affected by changes in configuration of the operating parameters). The process parameters can represent one or more dependent variables associated with the operating parameters, which can be user-configurable. The received data, in some implementations, represents data measured after completion of a cycle of the injection molding process. As described here, an injection molding process is an example of a discrete-type manufacturing process, though other discrete-type manufacturing processes will be apparent to those of skill in the art.

In some embodiments, updating involves communicating one or more of the determined values for the operating parameters to a machine, tool, mold, or apparatus of the injection molding process. Updating can also involve setting at least one operating parameter of a machine, tool, mold, or apparatus associated with the injection molding process.

Some implementations feature determining (e.g., as part of the comparison step) at least one of a predicted score value, a multivariate statistic, or both. In such embodiments, the condition is satisfied if the predicted score value, the multivariate statistic, or both exceeds one or more threshold values, functions, or levels. The multivariate statistic can include at least one of a score, a Hotelling's $T^2$ value, a DModX value, a residual standard deviation value, or any combination of these. The DModX value is a residual standard deviation calculated from the residuals, e.g., after subtracting the accepted model behavior from the scaled and centered process data. A high DModX score indicates that the current process observation is deviating from the expected behavior of the model. The $T^2$ value is a second summary statistic that represents the distance of the collected data from that of the standard operating conditions. In other words, the DModX statistic can be considered a measure of the uncertainty while the $T^2$ statistic can be considered a measure of the variation. The multivariate statistic can also include a principal components analysis or partial least squares analysis.

The condition can include a trend in a multivariate analysis (or multivariate statistics) of the injection molding process. In some arrangements, the criterion for updating the values of the operating parameters comprises optimization of a function. Moreover, determining one or more values for the set of operating parameters involves optimizing an objective function that includes values of controllable parameters of the injection molding process. For example, optimizing the objective function can include minimizing the objective function, which can be a quadratic function.

In some embodiments, the method involves detecting at least one fault condition of the injection molding process and filtering the received data associated with process parameters of the injection molding process in response to detecting the at least one fault condition. The at least one fault condition can, for example, include a fault state or a trend towards a fault state. Filtering can involve disregarding a portion of the received data or removing a portion of the received data. A fault condition can be detected (or determined to exist) based in part on a fault detection model or on a default model.

Some implementations of the method involve detecting at least one fault of the injection molding process and modifying the multivariate model based on the detected fault. The method can also involve generating the multivariate model that approximates the injection molding process or updating the multivariate model based at least in part on the received data. Updating the multivariate model involves, for instance, modifying values in the multivariate model or generating a new multivariate model. The multivariate model can include variables associated with any one or more of environmental changes, material changes, process setpoint changes, deterioration of at least one process tool of the injection molding process, temperature changes of the mold, or any combination thereof.

Another aspect features a system for controlling an injection molding process. The system includes data acquisition means, data comparison means, process logic means, and process control means. The data acquisition means is configured to receive data measured after at least a portion of the injection molding process, and the data represents process parameters and/or operating parameters (or both) of the injection molding process. The data comparison means is configured to compare the received data with a multivariate model that approximates the injection molding process to provide a result. The process logic means is configured to determine, upon the result of the comparing satisfying a condition, one or more values for a set of operating parameters for the injection molding process. The process control means is configured to update at least one operating parameter of the injection molding process when the one or more determined values for the set of operating parameters satisfies a criterion.

Yet another aspect relates to a method for controlling a discrete-type manufacturing process with a multivariate model. The method includes providing a closed-loop controller including the multivariate model, a data comparison module, and a solver module. The multivariate model represents the manufacturing process (or contains data representative of the manufacturing process). The data comparison module is configured to compare (and compares, when operated or executed, either on a cycle-by-cycle basis or a per-routine basis) received data measured after completion of at least a portion of the manufacturing process with the multivariate model. In some implementations, the data comparison module monitors each cycle of the injection molding process and determines when and whether to invoke the controller. The received data is representative of process parameters, operating parameters, or both of the manufacturing process. The solver module is configured to determine (and determines, when operated or executed) at least one control action for the manufacturing process based on an output of the data comparison module. The method involves updating a set of operating parameters of the manufacturing process based on the at least one control action determined by the closed-loop controller.

Another aspect relates to a system for controlling a discrete-type manufacturing process. The system includes a data processing module in communication with the manufacturing process or system (e.g., machines, tools, molds, or other equipment), a solver module, and a controller module. The data processing module is configured to receive (and receives, when operated or executed) data measured after at least a portion of the manufacturing process. The data represents process parameters, operating parameters, or both of the manufacturing process. The data processing module compares the received data with a multivariate model that approximates the manufacturing process and determines at least one of a predicted score value, a multivariate statistic, or both. The solver module is configured to receive (and receives, when operated) the predicted score value, the multivariate statistic, or both. When the predicted score value, multivariate statistic, or both satisfies a condition, the solver module generates a set of operating parameters for the manufacturing process based on an optimized objective function that associates values of configurable parameters of the manufacturing process, multivariate statistics, and dependent variable data. The controller module is configured to update (and updates, when operated or executed) at least one operating parameter of the manufacturing process.

Some implementations include any of the above-described aspects featuring any of the above embodiments or benefits thereof.

These and other features will be more fully understood by reference to the following description and drawings, which are illustrative and not necessarily to scale. Although the concepts are described herein with respect to a discrete-type manufacturing process, for example an injection molding process, it will be apparent to one of skill in the art that the concepts are relevant to other discrete-type processes.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
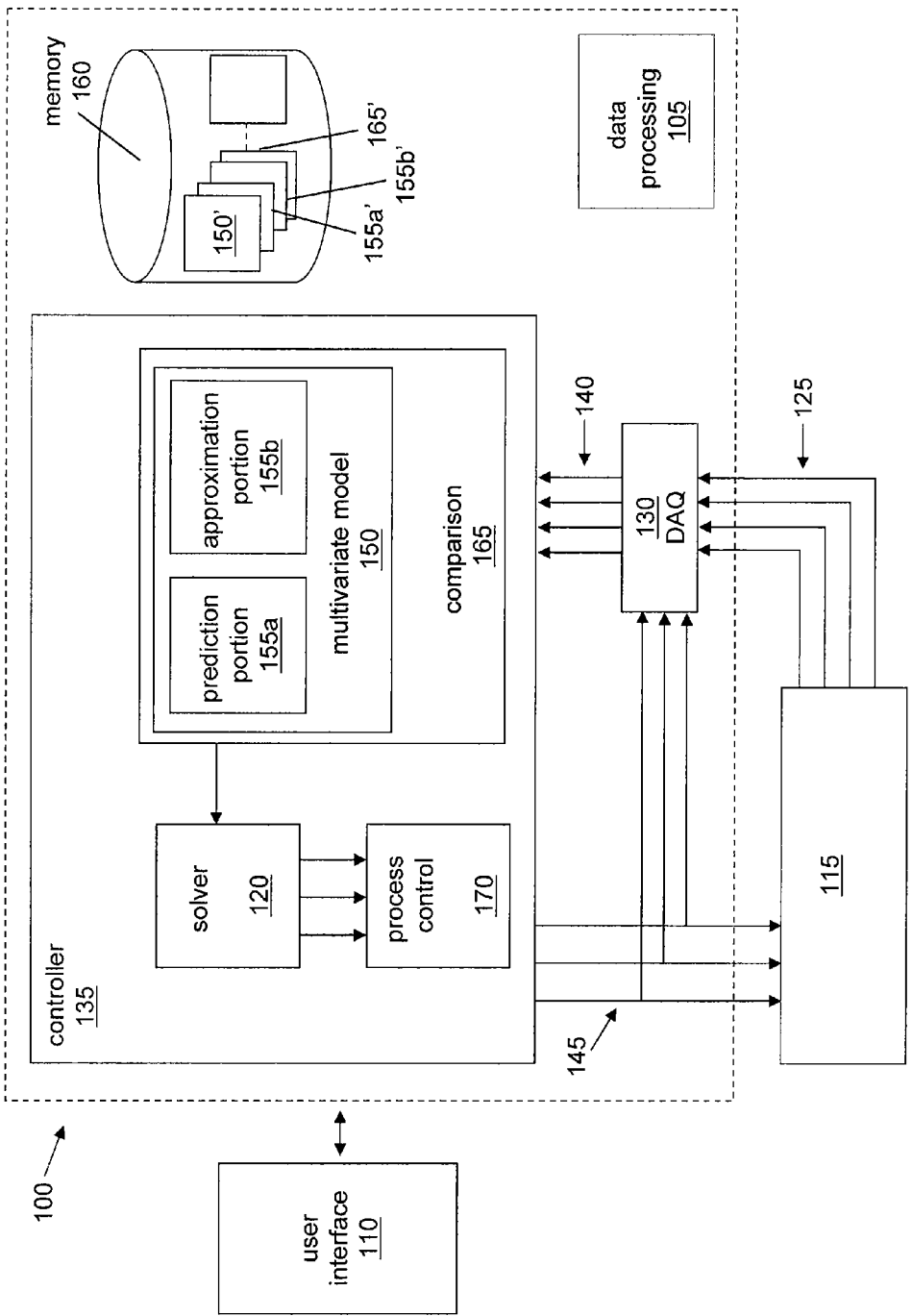
FIG. 1 is a block diagram illustrating an exemplary system for controlling a discrete-type manufacturing process.
Figure 4:
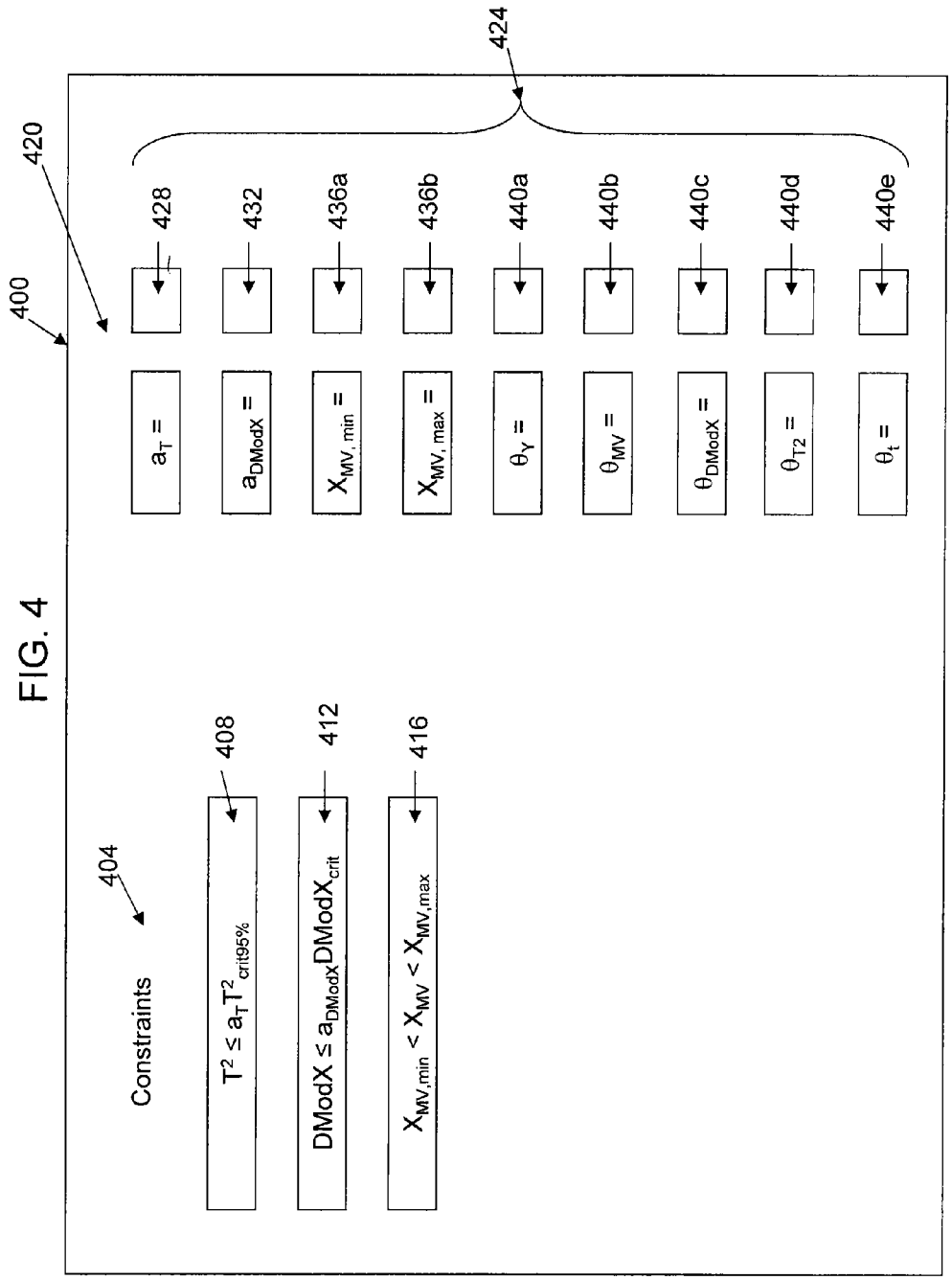
FIG. 4 is an exemplary user interface for specifying constraints to be applied to optimize a controller objective function.

FIG. 1 depicts an exemplary system 100 for controlling a discrete-type manufacturing process. The system includes a data processing module 105 and a user interface 110. The user interface 110 can include a computer keyboard, mouse, other haptic interfaces, a graphical user interface, voice input, or other input/output channel for a user to communicate with the data processing module 105 in response to stimuli from the processor 105 (e.g., to specify values for constraints). FIG. 4 illustrates an exemplary user interface suitable for use with the system 100. The user interface 110 can include a display such as a computer monitor. The data processing module 105 is coupled to and/or in communication with a discrete-type manufacturing processing facility 115 (e.g., an injection molding system, or components thereof). The processing facility 115 performs discrete-type manufacturing or processing operations. For example, in the context of the injection molding industry, the processing facility 115 can perform any one of delivering, filling, packing, holding, cooling, storing, or post-cooling functions by machines, tools, apparatus, or molds. In an injection molding process, material features, mold structure, and processing conditions affect consequences of each stage including energy consumption, cycle or processing time, weight, scrap rate, or other conditions.

In some embodiments, the tools or processes include multiple stations or units within the facility 115. These functions can be associated with a plurality of physical parameters, for example, pressure, temperature, and time, among many others. The physical parameters can be monitored and manipulated to produce a plurality of outputs 125 containing data about the variables (e.g., the physical parameters and/or tool operating conditions) in the processing facility 115. The outputs 125 can be electrical, optical, magnetic, acoustic, or other signals capable of transmitting the data or being transmitted to or within the processor 105. The outputs 125 can include data representative of process parameters (also referred to as dependent variable data $X_D$), operating parameters (also referred to as manipulated variable data $X_{MV}$), or both. In some embodiments, the outputs 125 provide raw data that can be manipulated before being used as dependent variable data or manipulated variable data. Examples of such manipulation include pre-processing, scaling, filtering, or sorting.

The processing facility 115 is coupled to and communicates with the data processing module 105 by a data acquisition module 130. The data acquisition module 130 receives data from the processing facility 115 e.g., via outputs 125. The received data is measured after at least a portion of the manufacturing process and represents process parameters, operating parameters, or both of the manufacturing process. In some implementations, the received data is measured at the end of the manufacturing process (e.g., after the molten material and/or the mold has cooled). The data acquisition module 130 can perform buffering, multiplexing, signaling, switching, routing, formatting, and other functions on the received data to put the data in a format or condition for suitable communication or retransmission to other modules of the data processing module 105.

The system 100 also includes a controller module 135. The controller module 135 can be or can comprise a closed-loop controller. For example, the controller can be implemented using a Senselink™ process controller (MKS Instruments, Andover, Mass.) connected by Ethernet to a PC running MATLAB™ (Mathworks, Natick, Mass.) interfaced to a SIMCA-QP (Umetrics, San Jose, Calif.) program. The controller module 135 receives data from the data acquisition module 130, e.g., via communication links 140. The controller module 135 specifies operating parameters (e.g., manipulated variable data $X_{MV}$) and communicates the specified values to the processing facility 115 (or tools, machines, apparatus, or molds associated therewith) and the data acquisition module 130 via a plurality of outputs 145. The manipulated variable data can represent at least one operating parameter of the manufacturing process. Alternatively or additionally, the manipulated variable data can represent setpoint values of particular processing parameters (e.g., temperature of the molten material or mold, material flow rate, pressure, processing time, cycle time, and others) or instructions for particular process tools (e.g., "open" after a period of time). The controller module 135 includes a comparison module 165. The comparison module 165 includes a multivariate model 150. The multivariate model 150 includes a prediction portion 155a and an approximation portion 155b. The multivariate model 150 is used, in conjunction with other modules of the controller module 135 (e.g., a solver module 120 and comparison module 165), to establish values of operating parameters or manipulated variables that produce desirables values of process parameters or dependent variable data (e.g., data within an acceptable knowledge space for the particular manufacturing process). For example, the comparison module 165 compares the received data with the multivariate model 150. The prediction portion 155a is used to determine multivariate statistics, predicted score values, and variable values for use in conjunction with other modules of the controller module 135. In some implementations, the prediction portion 155a determines trends in multivariate statistics that indicate a condition or movement towards a condition, such as a fault. The solver module 120 receives the values determined by the prediction portion 155a and determines whether they satisfy a condition indicating, for example, that the operating parameters of the manufacturing process need updating. In this way, the prediction portion 155a is used to determine whether the controller module 135 is to be used to update operating parameters of the processing facility 115. If the condition is satisfied, the solver module 120 generates a set of operating parameters for the manufacturing process based on an optimized objective function that associates values of configurable parameters of the manufacturing process (e.g., operating parameters) and dependent variable data (e.g., process parameters). The controller module 135 then updates at least one operating parameter of the manufacturing process by, for example, updating the setpoint values on one or more pieces of equipment. In some embodiments, the controller module 135 verifies that the at least one operating parameter has been updated by performing a check that the setpoint value has been changed from the previous setpoint value to the determined and communicated setpoint value.

The system 100 also includes a memory 160. The memory 160 can be used for, for example, storing previously-generated multivariate models 150', and/or previously-generated prediction portions 155a', and/or previously-generated approximation portions 155b', and/or previously-generated results 165' from the comparison module for later use. Other information can also be stored in the memory 160, as will be appreciated.

Figure 2:
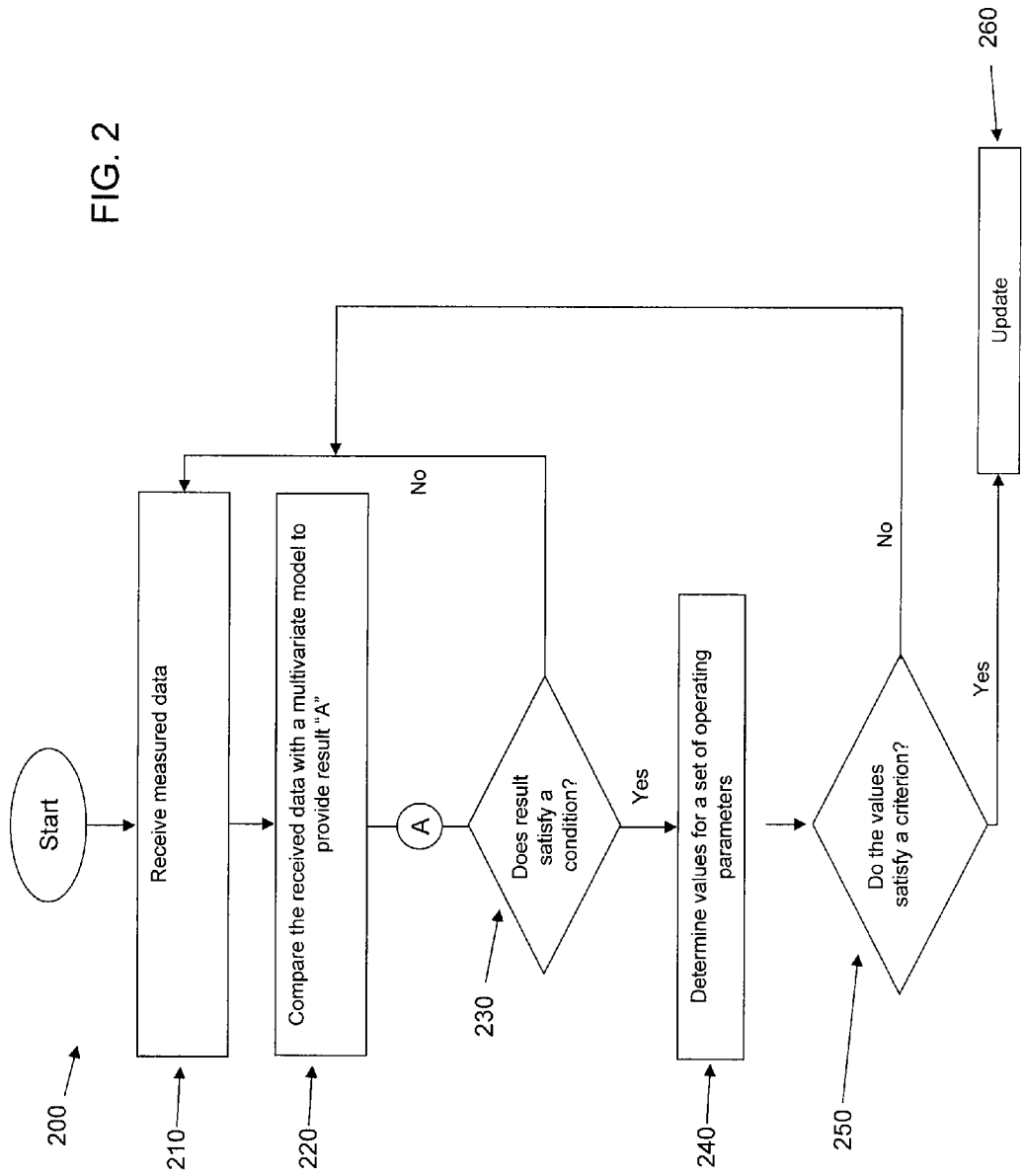
FIG. 2 is a flow chart depicting an exemplary method for controlling an injection molding process.

FIG. 2 is a flow chart depicting an exemplary process 200 for controlling an injection molding process. The process 200 involves receiving data measured after at least a portion of the injection molding process (step 210). Referring to FIG. 1, step 210 can involve the data acquisition module 130 receiving measured data from the processing facility 115. The received data represents process parameters (e.g., dependent variable data $X_D$), operating parameters (e.g., manipulated variable data $X_{MV}$), or both. In some implementations, the values of the received process parameters include values observed outside of a mold. Sometimes, the values of the received data include values observed within one or more cavities of the mold. Some configurations involve the received data including values observed both outside the mold and one or more cavities inside the mold. The decision whether to receive data from sensors inside or outside the mold, or both, often depends on practical considerations such as cost (generally in-mold sensors are more expensive than sensors outside the mold) and precision. The received data can represent data measured after completion of a cycle of the injection molding process or data measured after a portion of a cycle. In some embodiments, the measured data is sampled during the cycle of the injection molding process. Some embodiments involve accumulating the received data over a predetermined number of cycles after a change in a setpoint of the injection molding process has occurred, for example, after a steady-state or equilibrium in the process has been achieved.

In step 220, the received data is compared with a multivariate model. Referring to FIG. 1, comparison module 165 (after receiving information from data acquisition module 130 or intervening preprocessing modules) executes a routine or program to compare the received data with multivariate model 150 to provide a result (shown as "A"). In some embodiments, the method 200 involves first generating the multivariate model 150 that approximates the injection, molding process (not shown).

If the result of the comparing in step 220 satisfies a condition (step 230), the method invokes the updating process (steps 240, 250, 260). If the result of the comparison in step 220 does not satisfy the condition, the controller is not invoked, and the process iterates to step 210. Referring to FIG. 1, the solver module 120 or other suitable process logic means examines the result "A" to determine if the result satisfies the condition. If so, the solver module 120 determines one or more values for a set of operating parameters for the injection molding process (shown in step 240). For example, the comparing of step 220 involves determining at least one of a predicted score value, a multivariate statistic, or both and the condition in step 230 is satisfied if the predicted score value, the multivariate statistic, or both exceeds one or more threshold functions, values, or levels. In some embodiments, the condition of step 230 comprises a trend in a multivariate analysis of the injection molding process.

In a detailed example, the predicted score value for step 230 can be a predicted yield score ($Y_{pred}$). The predicted yield score $Y_{pred}$ is similar to the scores provided in statistical process control without a multivariate model (e.g., the predicted yield score can be based on a principal component analysis or partial least squares calculation). The one or more multivariate statistics can include a Hotelling $T^2$ value or a DModX value. Similarly, the one or more multivariate statistics can include a residual standard deviation value, a principal component analysis (PCA) score, a partial least squares (sometimes called projection to latent structures) (PLS) score, or any combination of the multivariate statistics discussed here. In some embodiments, the multivariate model 150 provides the at least one of the predicted score value, the multivariate statistic, or both to the solver module 120, which in turn serve as constraints to the solver module in step 250.

The controller module 135, using the multivariate model 150, can perform, for example, a Hotelling calculation or a DModX calculation on the received data by means of a principal components or partial least squares analysis to determine a $T^2$ or DModX value, respectively. A $T^2$ value can be calculated according to the following equation:

$$T^2 = \left(\frac{\bar{x} - \mu_0}{\sigma}\right)^T S^{-1} \left(\frac{\bar{x} - \mu_0}{\sigma}\right),$$

where:
$\sigma$=standard deviation for one or more measured variables, based on data received, $$\bar{x} = \begin{bmatrix} \bar{x}_1 \\ \bar{x}_2 \\ M \\ \bar{x}_k \end{bmatrix},$$

measured value of variables, for k variables, $$\mu_0 = \begin{bmatrix} \mu_1^0 \\ \mu_2^0 \\ M \\ \mu_k^0 \end{bmatrix},$$

mean value of variables based on data received, for k variables,
$S^{-1}$=an inverse covariance or correlation matrix, which is the inverse of the covariance or correlation matrix, S, illustrated below:

$$S = \begin{bmatrix} \bar{S}_1^2 & \bar{S}_{12} & \bar{S}_{13} & \Lambda & \bar{S}_{1k} \\ & \bar{S}_2^2 & \bar{S}_{23} & \Lambda & \bar{S}_{2k} \\ & & \bar{S}_3^2 & \Lambda & \bar{S}_{3k} \\ & & & O & M \\ & & & & \bar{S}_k^2 \end{bmatrix}$$

where:

$$S_{ij} = \frac{1}{N-1} \sum_{i=1}^{k} \sum_{j=1}^{n_j} (x_{ij} - \bar{x})(x_{ij} - \bar{x})^T,$$

where indices i and j identify the matrix element for both S and x in a generalized k×n matrix.

In the multivariate modeling example above, the x-variables in the above equations usually are score vectors of a principal components or partial least squares model usually with mean values ($\mu_0$) equaling zero. Because these score vectors are orthogonal, the matrices S and $S^{-1}$ are diagonal with the variances and respective inverse variances of each component score vector as diagonal elements.

A t-score value can be thought of as a projection onto a line (e.g., a principal components or partial least squares model axis) in a k-dimensional space that provides an acceptable approximation of the data (e.g., a line that provides an acceptable least squares fit). A second t-score can be used (e.g., a projection onto a line orthogonal to the first line) in some embodiments. In some embodiments, multiple t-scores can be used.

In general, a $T^2$ value is a calculation of the weighted distance of manufacturing process variables for an output of the manufacturing process relative to an output produced under normal process operation or based on predicted values of dependent variable data and/or manipulated variable data. One way to understand the meaning of the $T^2$ value is to consider it in terms of a geometric description. A normal manufacturing process is a cluster of data points in a k-dimensional space, where k is the number of measured manufacturing process variables. The pertinent space can also be the reduced dimensionality space of the scores. Hotelling's $T^2$ value is the squared distance of a new output from the center of this cluster of data points weighted relative to the variation output of the normal process condition. The variation is often illustrated as an A-dimensional hyper-ellipse that bounds the cluster of data points, where A represents the number of PCA or PLS scores. In general, Hotelling-type calculations can be used to, for example, determine whether a particular point is an outlier (e.g., outside the hyper-ellipse) with respect to the remainder of the data set. More specifically, a Hotelling calculation can be used to determine whether a particular measured parameter is outside an alarm limit or outside the control space, as determined by a mathematical model for the process parameters being observed.

Another example of a multivariate statistic is a DModX calculation or residual standard deviation calculation. A DModX calculation involves calculating the distance of a particular data point from a location in a k-dimensional space that represents a preferred location. The DModX value is calculated using a principal components or partial least squares analysis that maps the k-dimensional variable to a lower order (e.g., less than order k) dimensional variable (e.g., a score space). Mathematically, the DModX value is the orthogonal component (or residual) resulting from the principal components or partial least squares analysis. A DModX value can be indicative of a range of values (e.g., a "tolerance volume") about one or more variables (e.g., data points) in the mathematical model.

Returning to FIG. 2, the method involves evaluating whether the determined values for the operating parameters satisfy a condition (step 250). If not, the process 200 iterates back to receiving measured data in step 210. If, on the other hand, the determined values for the operating parameters satisfy the condition of step 250, the process 200 proceeds to update an operating parameter of the injection molding process (step 260). Referring to FIG. 1, the solver module 120 determines whether the situation warrants updating the injection molding process. If so, the solver module 120 communicates with the process control module 170 which updates at least one operating parameter of the injection molding process (step 260) when the one or more determined values from step 240 satisfies a criterion (step 250).

In some embodiments, the solver module 120 determines the one or more values for the set of operating parameters (step 240) by performing a search for manipulated variable values that satisfy an objective function. In turn, the determined values satisfy a criterion (step 250) if the objective function is optimized. Optimizing the objective function can include minimizing the objective function relative to some factor, variable, or parameter. Some embodiments feature maximizing the objective function. In some embodiments, the objective function is a quadratic function. Optimization of a controller objective function, described in more detail below with respect to FIGS. 3 and 4, can be implemented through the use of any suitable tool (or tools) which may be a part of or logically separate from the solver module 120. For example, the fmincon function from the MATLAB™ optimization toolbox (sold by The MathWorks, Inc. of Natick, Mass.) can be utilized, as is or updated per a user's configuration, to achieve optimization of a selected controller objective function.

In some embodiments, step 260 involves updating (e.g., by the process control module 170) one or more of the determined values to a tool of the injection molding process by communicating those values to a machine, tool, mold, or equipment of the processing facility. Updating, in some instances, involves setting at least one operating parameter of a machine associated with the injection molding process. Some examples of operating parameters that can typically be updated include at least: shot size, transfer position, water temperature, injection velocity, hold pressure, hold time, cooling time, barrel and hot runner temperatures, back pressure, screw RPMs, and/or material.

Figure 3:
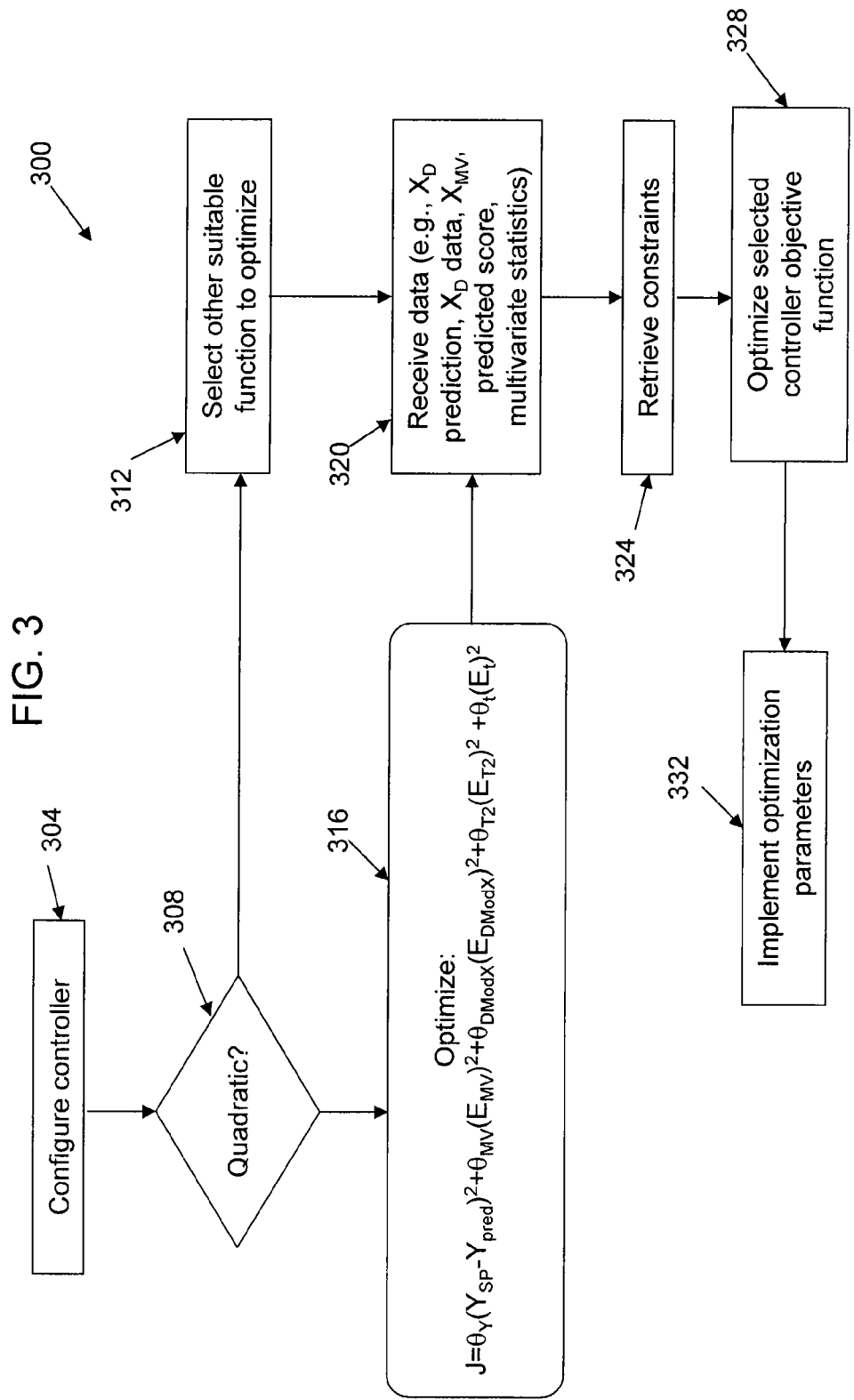
FIG. 3 is a flow chart illustrating an exemplary method for determining and implementing operating parameters for a manufacturing process.

FIG. 3 is a flow chart illustrating a process 300 for determining and updating (or implementing) operating parameters for a discrete-type manufacturing process, such as an injection molding process. The process can be used, for example, in conjunction with steps 240-260 of FIG. 2. In step 304, a controller is configured. In some embodiments, a user configures the controller based on certain variable or binary values. An example of a controller configuration is the type of objective function that is optimized. For example, at step 308, a query determines whether the controller objective is a quadratic-type control function. If the control objective is not a quadratic-type function, an alternative or complementary function to optimize is selected (step 312).

If a quadratic-type control function is selected at step 308, the process 300 proceeds to step 316, which illustrates a quadratic-type control function to optimize. The objective function, J, associates the certain received data (e.g., operating parameters and process parameters), optional constraints, and optional penalty values. In some embodiments, optimizing the quadratic-type objective function involves minimizing J over the value of the manipulated variable data $X_{MV}$ or a subset of the operating parameters. The data set to optimize over can also be a configurable state or constraint.

The objective function can be thought of as involving, generally, two categories of data associated with a manufacturing process. One type of data, usually denoted X-type data (e.g., X data, X-variables, X sets, or observation-level data), are indicative of factors, predictors, or indicators. X-type data are used to make projections or predictions about, for example, the manufacturing process or results of the manufacturing process. Another type of data, usually denoted Y-type data (e.g., Y data, Y-variables, Y sets), are indicative of yields or responses of the manufacturing processes. X-type data and Y-type data are generally related. Often the exact relationship between the X-type data and Y-type data are uncertain or difficult or impossible to determine. The relationship can, in some instances, be approximated or modeled by various techniques (e.g., linear approximation, quadratic approximation, polynomial fitting methods, exponential or power-series relationships, multivariate techniques (such as principal component analysis or partial least squares analysis) among others). In such cases, the relationship between X-type data and Y-type data can be inferred based on observing changes to both types of data and observing the response such changes cause to the other set of data.

An additional advantage results from partitioning or dividing the X-type variables into subsets or sub-types. One subset of X-type data is identified as manipulated variables (or manipulated variable values) and denoted $X_{MV}$. Another subset of X-type data is identified as dependent variables and denoted $X_D$. Manipulated variables are generally variables or manufacturing parameters that can be directly controlled such as, for example, shot size, transfer position, water temperature, injection velocity, hold pressure, hold time, cooling time, barrel and hot runner temperatures, back pressure, screw RPMs, and/or material. In general, a manufacturer usually accounts for or monitors less than about 20 manipulated variables due to processor and memory limitations in monitoring and analytical systems. Processes involving more than about 20 operating parameters can become computationally unwieldy. Dependent variables are generally variables that are measured by sensors (e.g., outside the mold or within one or more cavities of the mold) and whose setpoints cannot be controlled directly. Examples of dependent variables are, for example, injection pressure, cavity temperature and pressure, injection time, melt temperature, cooling rate, chamber temperature, relative humidity, temperature or pressure gradients, impurity levels, wear-and-tear on a machine, and others. Additionally, the dependent variables can represent a reduced data set (e.g., variables derived from raw data, such as differential temperature, temperature gradients, and others). Dependent variables can be related to, associated with, or dependent on the values of the manipulated variables, e.g., either via known relationships or unknown relationships which may or may not be empirically determinable and/or modeled.

The objective function J of step 316 to be optimized is $$J = \theta_Y(Y_{SP} - Y_{pred})^2 + \theta_{MV}(E_{MV})^2 + \theta_{DModX}(E_{DModX})^2 + \theta_{T^2}(E_{T^2})^2 + \theta_t(E_t)^2$$

where:

$Y_{SP}$=a setpoint or target value for Y data values (e.g., yield or quality);

$Y_{pred}$=a predicted value for Y data values. In some embodiments, $Y_{pred}$ is determined by a partial least squares model or other suitable model based on $X_{MV}$, $X_D$, and $X_K$. $X_K$ represents the known past or present values of $Y_{SP}$, $Y_{pred}$, represents $X_{MV}$, and $X_D$; and $X_{MV}$ represents future values of the manipulated variables for control. For example, $Y_{pred}=f_Y(X_K, X_{MV}, X_D)$ where $f_Y$ is a modeling function;

$\theta_Y$, $\theta_{MV}$, $\theta_{DModX}$, $\theta_{T^2}$, and $\theta_t$ are penalty weights;

$E_{MV}$=a function relating an amount of deviation in the manipulated variables from a desired trajectory that is subject to the penalty weight $\theta_{MV}$;

$E_{DModX}$=the amount of the DModX space that is subject to the penalty $\theta_{DModX}$;

$E_{T^2}$=the amount of the Hotelling $T^2$ score that is subject to the penalty $\theta_{T^2}$;

$E_t$=the portion of the scores, t, that are subject to the penalty $\theta_t$;

As discussed above, $T^2$ represents a distance of a multivariate system from its center point in the model hyperplane. The $T^2$ values are based on a function ($f_{T^2}$) derived from a principal component analysis or partial least squares model and can be represented as $T^2 = f_{T^2}(X_K, X_{MV}, X_D)$. DModX represents a deviation of the multivariate system from the model hyperplane. The DModX values are based on a function ($f_{DModX}$) derived from a principal component analysis or partial least squares model and can be represented as DModX=$f_{DModX}$ ($X_K, X_{MV}, X_D$). The t values are based on a function ($f_{ti}$) derived from a principal component analysis or partial least squares model and can be represented as $t_i = f_{ti}(X_K, X_{MV}, X_D)$, where $t_i$ represents the value of the $i^{th}$ score. The values of $X_D$ represent future values of dependent variables and are based on an appropriate function ($f_{XD}$) relating $X_K$ and $X_{MV}$, e.g., $X_D = f_{XD}(X_K, X_{MV})$. In some embodiments, $f_{XD}$ is a finite impulse response (FIR) model. The function $f_{XD}$ can also be an auto-regressive moving average model (ARMA). Other types of models of $f_{XD}$ will be apparent to those of skill in the art.

In some embodiments, the objective function J is subject to default constraints. An example of a default constraint on manipulated variable data is shown below:

$$X_{MV_{min}} < X_{MV} < X_{MV_{max}}$$

Some implementations do not require all of the penalty weights discussed above. For example, if the user's objective is to maintain a system or process within the space of the multivariate model (e.g., for design-space control), the method can ignore the contributions of the Y variables (e.g., because no Y variables will be calculated). In such a case, the penalty $G_y$ can be set to 0.

The values or functional representation of $E_{MV}$, $E_{DModX}$, and $E_{T2}$ can be determined according to a variety of methods. For example, the $E_i$ term can be a sum of squared distances from a target or threshold. Specific implementations are discussed below, but it will be apparent to those of skill in the art that other implementations are also possible.

$$E_{MV} = \Delta X_{MV}^T \cdot \Delta X_{MV};$$

where $\Delta X_{MV}$ is a vector representing changes or deviations in observed values of $X_{MV}$ from the particular processing recipe;

$$E_{T^2} = \sum_h \{MAX((T_h^2 - T_{h,max}^2), 0)\}^2;$$

where $T^2_{h,max}$ represents maximum values of $T^2$ threshold at h future points in time and $T^2_h$ represents values of $T^2$ at h future points in time; and $$E_{DModX} = \sum_h \{MAX((DModX_h - DModX_{h,max}), 0)\}^2;$$

where $DModX_{h,max}$ represents maximum values of DModX threshold at h future points in time and $DModX_h$ represents values of DModX at h future points in time.

At step 320, data are received. The data can include, for example, values for operating parameters, process parameters, predicted dependent variable data, predicted variable values, one or more multivariate statistics, or any combination of these data types. The data can be used as an input for, for example, a solver module 120 that determines operating parameters (e.g., manipulated variable values) that satisfy a controller objective.

Additionally, the process 300 involves retrieving one or more constraints (step 324) if constraints are applied (e.g., from a memory 160 or via a user interface 110). The constraints can be user-specified, or the constraints can be default or threshold values. In some embodiments, when a particular type of data is not received, the constraints associated with that type of data are not used for optimization of the objective function. For example, if predicted dependent variable data are not received or used, constraints associated with predicted dependent variable data are disabled, unavailable, or not used, e.g., by the solver module 120.

Step 328 involves a process of optimizing the selected controller objective function. Examples of suitable controller objective functions are quadratic-type functions, linear functions, or nonlinear functions that penalize operations that stray from the objective. In some embodiments, the particular constraints and/or penalties used or values ascribed to the penalties or constraints can vary depending on the particular objective. In some embodiments, the optimization algorithm examines past observations of the operating parameters $X_{MV}$, and corresponding values of the objective function, J. The optimization algorithm then proposes a candidate set of operating parameters that are expected to lead to improved performance. This set of operating is used to predict the expected process states, $Y_{pred}$, using dynamic process models without actually implementing the operating parameters on the molding machine. In some embodiments, dynamic process models for each process state included in the optimization can be developed or used.

After the objective function is optimized (step 328), the optimization parameters are determined and implemented (step 332). For example, the optimization parameters can result in a set of values or adjustments for the manipulated variable data, and the values or adjustments are communicated to one or more process tools. The process tools are then manually or automatically updated or confirmed based on the provided manipulated variable data.

FIG. 4 is an exemplary user interface 400 for specifying constraints to be applied to optimize a controller objective function, e.g., of the type illustrated at step 316 of FIG. 3. The user interface 400 includes an area 404 identifying constraints on an objective function (not shown) to be optimized. The area 404 illustrates a $T^2$ constraint 408, a DModX constraint 412, and an $X_{MV}$ constraint 416 (e.g., relating to operating parameters). Other constraints (not shown) can also be used depending on user or designer preference. The user interface 400 includes a second area 420 identifying a plurality of fields 424 for displaying values associated with the constraints 408, 412, 416, or with a plurality of penalties of the objective function. Each of the values of the plurality of fields 424 can be a default value or a value specified by a user (e.g., via the user interface 400).

For example, the second area 420 includes an $a_T$ field 428 displaying the value of $a_T$ associated with the $T^2$ constraint 408. The $T^2$ constraint 408 relates measured or calculated values of $T^2$ against a user-specified threshold or critical value (e.g., 95% confidence) of $T^2$. The second area 420 includes an $a_{DModX}$ field 432 displaying the value of $a_{DModX}$ associated with the DModX constraint 412. The DModX constraint 412 relates measured or calculated values of DModX against a user-specified threshold or critical value (e.g., $DModX_{crit}$) of DModX. The second area also includes an $X_{MV,min}$ field 436a and an $X_{MV,max}$ field 436b both associated with the $X_{MV}$ constraint 416. The $X_{MV}$ constraint 416 constrains, e.g., the solver module, during a determination of $X_{MV}$ values to optimize a controller objective by providing minimum and maximum allowable values of $X_{MV}$ for the manufacturing process. These constraints allow the determined $X_{MV}$ values to converge on, for example, $T^2$ or DModX or within an acceptable design space.

The second area 420 also includes fields 440*a*-440*e* associated with penalties used in the objective function that is optimized. Specifically, the second area 420 includes a $\theta_Y$ field 440*a* that displays a penalty weight associated with Y variables in the objective function. The second area 420 includes a $\theta_{MV}$ field 440*b* that displays a penalty weight associated with the $E_{MV}$ relationship in the objective function J. The second area 420 includes a $\theta_{DModX}$ field 440*c* that displays a penalty weight associated with the $E_{DModX}$ relationship of the objective function J. The second area 420 includes a $\theta_{T2}$ field 440*d* that displays a penalty weight associated with the $E_{T2}$ relationship in the objective function J. The second area 420 includes a $\theta_t$ field 440*e* that displays a penalty weight associated with the $E_t$ relationship in the objective function J when the $E_t$ relationship is used.

Other constraints can also be used though not shown on the user interface 400. For example, a user or the system can specify minimum or maximum values of changes in $X_{MV}$ (e.g., $\Delta X_{MV}$). In some embodiments, the user can specify a penalty based on the size of $\Delta X_{MV}$. The user can specify minimum or maximum values of $Y_{pred}$ and/or specify a penalty based on the size of error in the Y variables (e.g., $Y_{err}$). Other representations of penalties or constraints associated with the multivariate statistics DModX and/or $T^2$ will also be apparent to those of skill in the art (e.g., associating a penalty value with the size of the DModX value or associating a penalty with the size of the $T^2$ value beyond a maximum or threshold).

Figure 5:
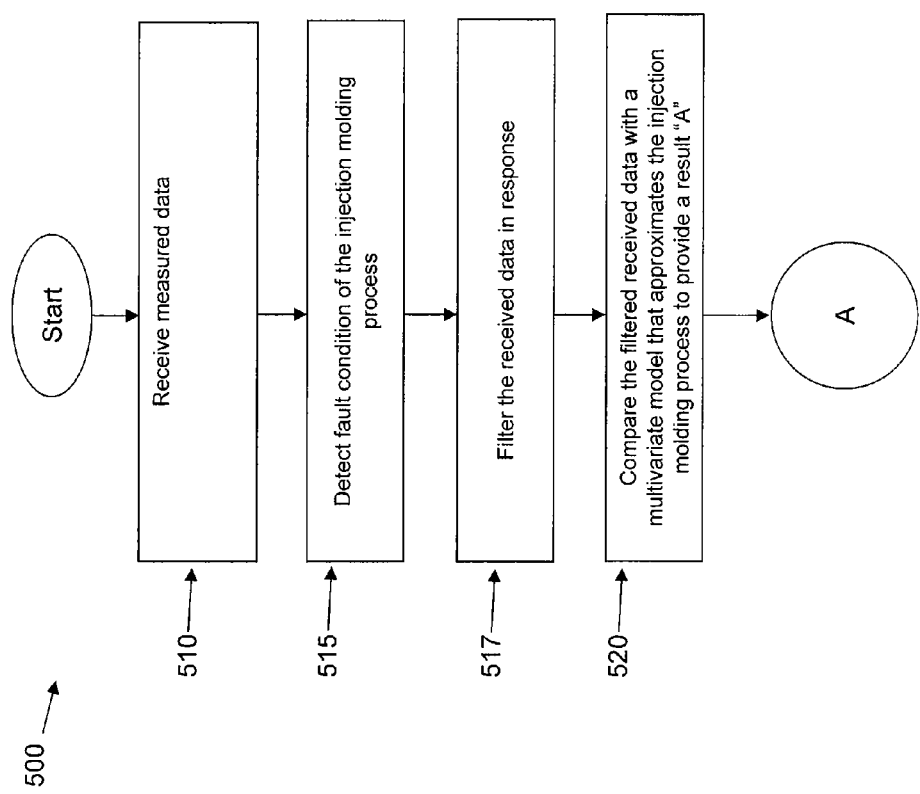
FIG. 5 is a flow chart depicting an exemplary method for incorporating fault detection into a method for controlling an injection molding process.

FIG. 5 is a flow chart depicting an exemplary process 500 for incorporating fault detection into a method for controlling an injection molding process (e.g., the process 200 of FIG. 2). In such embodiments, the controller can effectively ignore any one-off defects to keep future control actions based on normal and consistent process data. As in FIG. 2, the process 500 involves receiving data (e.g., representing process parameters, operating parameters, or both of the injection molding process by, for example, the data acquisition module 130). The received data has been measured after at least a portion of the injection molding process. At step 515, a fault detection module is invoked to determine whether a fault condition of the injection molding process has occurred. Such a fault detection module may be part of or separate from the controller module 135 of FIG. 1. In some embodiments, the at least one fault condition includes a fault state or a trend towards a fault state. The at least one fault condition can be detected based at least in part on a fault detection model. In some embodiments, the fault detection model is itself a multivariate model that can be, but is not required to be, incorporated in the multivariate model of the injection molding process described above. For example, determination of a fault can be based on a multivariate analysis of the received data (e.g., to see whether a principal-components analysis, a Hotelling $T^2$ score, or a DModX value (or a combination thereof) exceeds some alarm value).

In response to detecting the at least one fault condition, the received data associated with process parameters of the injection molding process is filtered (step 517). Filtering may include, for example, at least one of disregarding a portion of the received data or removing a portion of the received data from the data set to be evaluated for determining whether to invoke the controller or controller logic. The filtering may be accomplished by the fault detection module, a separate filtering module, or any other suitable module. Referring to FIG. 1, the comparison module 165 then compares the filtered received data with multivariate model 150 that approximates the injection molding process to provide a result, which is illustrated in step 520. In an implementation where the method 500 is associated with the process 200 of FIG. 2, the process 200 continues with steps 230-260 as described above with respect to FIG. 2 based on the comparison. FIGS. 2 and 5 illustrate the result "A", which can be used as the basis for determining whether to invoke control actions.

Figure 6:
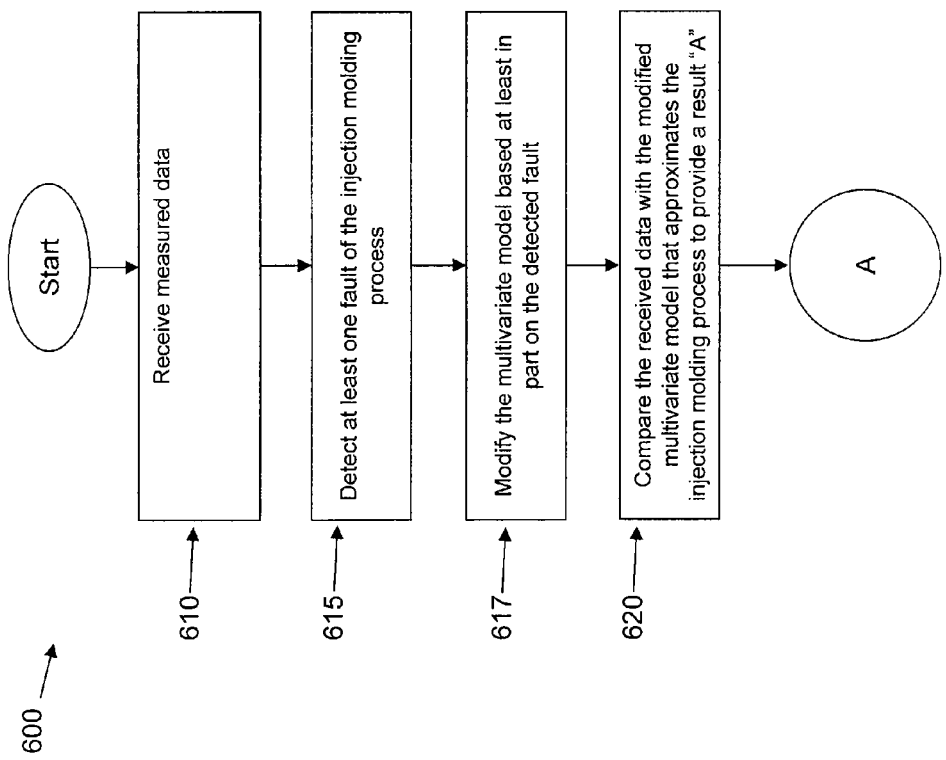
FIG. 6 is a flow chart depicting another exemplary method for incorporating fault detection into a method for controlling an injection molding process.

FIG. 6 is a flow chart depicting another exemplary process 600 for incorporating fault detection into a method for controlling an injection molding process. As in FIGS. 2 and 5, process 600 begins by receiving data (e.g., representing process parameters, operating parameters, or both of the injection molding process) measured after at least a portion of the injection molding process (step 610). Referring to FIG. 1, step 610 can be performed by, among other components, data acquisition module 130. At step 615, a fault detection module is invoked to detect at least one fault of the injection molding process. At step 617, in response to detection of a fault in the manufacturing process, a multivariate model that approximates the manufacturing process (e.g., the injection molding process) is modified based at least in part on the detected fault (e.g., the multivariate model 150 of FIG. 1). As with FIG. 5, the fault detection model is itself a multivariate model that can be, but is not required to be, incorporated in the multivariate model of the injection molding process described above. For example, determination of a fault can be based on a multivariate analysis of the received data (e.g., to see whether a principal-components analysis, a Hotelling $T^2$ score, or a DModX value (or a combination thereof) exceeds some alarm value). The received data is compared with the implementation modified multivariate model to provide a result "A" (step 620). In an implementation where the process 600 is associated with the process 200 of FIG. 2, the process 200 continues with steps 230-260 as described above with respect to FIG. 2 based on the comparison. FIG. 6 (like FIGS. 2 and 5) illustrates the result "A", which can be used as the basis for determining whether to invoke control actions.

The above-described techniques can be implemented in digital electronic circuitry, or in computer hardware, firmware, software, or in combinations of them. The implementation can be as a computer program product, e.g., a computer program tangibly embodied in a nontransitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device (e.g., a CRT (cathode ray tube) or LCD (liquid crystal display) monitor or a touchscreen), for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A computer-implemented method for optimizing an injection molding process, the method comprising:

receiving data measured after at least a portion of the injection molding process, the data representing process parameters, operating parameters, or both of the injection molding process;

approximating a current state of the injection molding process with a multivariate model that is generated using the received data to represent past or present values of one or more dependent variables;

predicting an expected state of the injection molding process with the multivariate model that is generated using the received data to represent future values of the one or more dependent variables;

comparing the approximated injection molding process with the predicted injection molding process to provide a result, the result comprising at least one of a predicted score value, a multivariate statistic, or both;

upon the result of the comparing satisfying a condition, determining one or more values for a set of operating parameters for the injection molding process that optimizes an objective function by adjusting one or more manipulable variables based on the future values of the one or more dependent variables; and dynamically optimizing the objective function during the injection molding process by updating at least one operating parameter of the injection molding process when the one or more determined values for the set of operating parameters satisfies a criterion.

2. The method of claim 1, wherein the set of operating parameters comprises ideal operating parameters of the injection molding process.

3. The method of claim 1, wherein updating comprises communicating one or more of the determined values to a tool of the injection molding process.

4. The method of claim 1, wherein updating comprises setting at least one operating parameter of a machine associated with the injection molding process.

5. The method of claim 1, wherein the condition comprises a trend in a multivariate analysis of the injection molding process.

6. The method of claim 1, wherein the condition is satisfied if the predicted score value, the multivariate statistic, or both exceeds one or more threshold functions.

7. The method of claim 1, wherein the multivariate statistic comprises at least one of a score, a Hotelling's $T^2$ value, a DModX value, a residual standard deviation value, or any combination thereof.

8. The method of claim 1, wherein the multivariate statistic comprises a principal components analysis or partial least squares analysis.

9. The method of claim 1, wherein the objective function includes values of controllable parameters of the injection molding process.

10. The method of claim 9, wherein dynamically optimizing the objective function comprises minimizing the objective function.

11. The method of claim 10, wherein the objective function is a quadratic function.

12. The method of claim 1, wherein the process parameters are not directly configurable during the injection molding process.

13. The method of claim 1, wherein the process parameters represent the one or more manipulable variables, and the one or more manipulable variables are associated with the operating parameters.

14. The method of claim 13, wherein the operating parameters are user-configurable.

15. The method of claim 1, wherein values of the process parameters comprise values observed outside of a mold, within one or more cavities of the mold, or both.

16. The method of claim 1, wherein the injection molding process is a discrete-type manufacturing process.

17. The method of claim 1, further comprising:
detecting at least one fault condition of the injection molding process; and
filtering the received data associated with process parameters of the injection molding process in response to detecting the at least one fault condition.

18. The method of claim 17, wherein the at least one fault condition comprises a fault state or a trend towards a fault state.

19. The method of claim 17, wherein filtering comprises at least one of disregarding a portion of the received data or removing a portion of the received data.

20. The method of claim 17, wherein the at least one fault condition is detected based at least in part on a fault detection model.

21. The method of claim 20, wherein the fault detection model is based on a default model.

22. The method of claim 1, further comprising:
detecting at least one fault of the injection molding process; and
modifying the multivariate model based at least in part on the detected fault.

23. The method of claim 1, further comprising:
generating the multivariate model that approximates the injection molding process.

24. The method of claim 1, further comprising updating the multivariate model based at least in part on the received data.

25. The method of claim 24, wherein updating the multivariate model comprises modifying values in the multivariate model or generating a new multivariate model.

26. The method of claim 1, wherein the one or more manipulable variables are associated with at least one of environmental changes, material changes, process setpoint changes, deterioration of at least one process tool of the injection molding process, temperature changes of the mold, or any combination thereof.

27. The method of claim 1, wherein the received data represents data measured after completion of a cycle of the injection molding process.

28. A method for optimizing a discrete-type manufacturing process with a multivariate model, the method comprising:
providing a closed-loop controller;
representing the manufacturing process with the multivariate model;
comparing, with a data comparison module, an approximated manufacturing process with an expected manufacturing process to provide a result, comprising at least one of a predicted score value, a multivariate statistic, or both, the data comparison module comprising an approximation portion and a prediction portion, wherein the comparing comprises;
approximating, with the approximating portion, the current state of the manufacturing process with the multivariate model that is generated using received data to represent past or present values of one or more dependent variables; and
predicting, with the prediction portion, the expected state of the manufacturing process with the multivariate model that is generated using the received data to represent future values of the one or more dependent variables;
determining, with a solver module, at least one control action for the manufacturing process based on an output of the data comparison module; and
dynamically optimizing an objective function during the manufacturing process by updating a set of operating parameters of the manufacturing process based on the at least one control action determined by the closed-loop controller.

29. A computer readable product, tangibly embodied in a non-transitory machine readable storage device operable to cause a data processing apparatus in communication with an injection-molding apparatus to:
receive data measured after at least a portion of the injection molding process, the data representing process parameters, operating parameters, or both of the injection molding process;
approximate a current state of the injection molding process with a multivariate model that is generated using the received data to represent past or present values of one or more dependent variables;
predict an expected state of the injection molding process with the multivariate model that is generated using the received data to represent future values of the one or more dependent variables;
compare the approximated injection molding process with the expected injection molding-process to provide a result, the result comprising at least one of a predicted score value, a multivariate statistic, or both;

determine, upon the result satisfying a condition, one or more values for a set of operating parameters for the injection molding process that optimizes an objective function; and dynamically optimize the objective function during the injection molding process by updating at least one operating parameter of the injection molding process when the one or more determined values for the set of operating parameters satisfies a criterion.

30. A system for optimizing an injection molding process, the system comprising:

data acquisition means for receiving data measured after at least a portion of the injection molding process, the data representing process parameters, operating parameters, or both of the injection molding process;

data approximation means for approximating a current state of the injection molding process with a multivariate model that is generated using the received data to represent past or present values of dependent variables;

data prediction means for predicting an expected state of the injection molding process with the multivariate model that is generated using the received data to represent future values of dependent variables;

data comparison means for comparing the approximated injection molding process with the expected injection molding process to provide a result, the result comprising at least one of a predicted score value, a multivariate statistic, or both;

process logic means for determining, upon the result of the comparing satisfying a condition, one or more values for a set of operating parameters for the injection molding process that optimizes an objective function by adjusting one or more manipulable variables based on the future value of the one or more dependent variables; and process control means for dynamically optimizing the objective function during the injection molding process by updating at least one operating parameter of the injection molding process when the one or more determined values for the set of operating parameters satisfies a criterion.

31. A system for optimizing a discrete-type manufacturing process, the system comprising:

a data processing module in communication with the manufacturing process, the data processing module configured to:

receive data measured after at least a portion of the manufacturing process, the data representing process parameters, operating parameters, or both of the manufacturing process;

approximate a current state of the manufacturing process with a multivariate model that is generated using the received data to represent past or present values of one or more dependent variables;

predict an expected stated of the manufacturing process with the multivariate model that is generated using the received data to represent future values of the one or more dependent variables;

compare the approximated manufacturing process with the expected manufacturing process; and determine at least one of a predicted score value, a multivariate statistic, or both;

a solver module configured to:

receive the at least one of the predicted score value, the multivariate statistic, or both; and generate, upon the predicted score value, multivariate statistic, or both satisfying a condition, a set of operating parameters for the manufacturing process based on an optimized objective function that associates values of configurable parameters of the manufacturing process and the one or more dependent variables; and a controller module configured to dynamically optimize an objective function during the manufacturing process by updating at least one operating parameter of the manufacturing process.

* * * * *